Jan. 21, 1958
G. W. JACKSON
2,820,647
CONTROL MECHANISM FOR REGULATING FLUID
FLOW IN A VEHICLE SUSPENSION
Filed Aug. 30, 1955
3 Sheets-Sheet 2
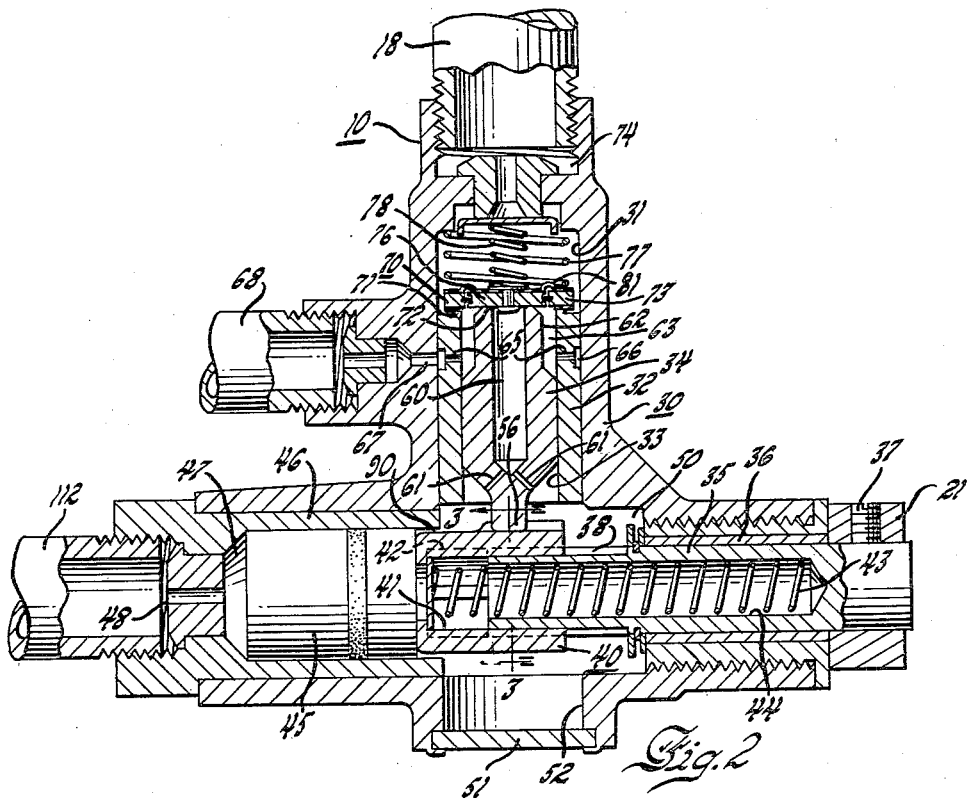
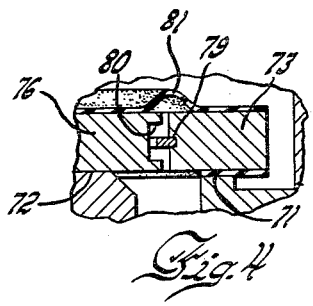
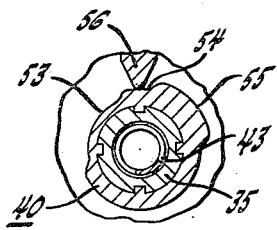
INVENTOR.
George W Jackson
BY
Craig V. Monton
HIS ATTORNEY Jan. 21, 1958     G. W. JACKSON     2,820,647
CONTROL MECHANISM FOR REGULATING FLUID
FLOW IN A VEHICLE SUSPENSION
Filed Aug. 30, 1955     3 Sheets-Sheet 3
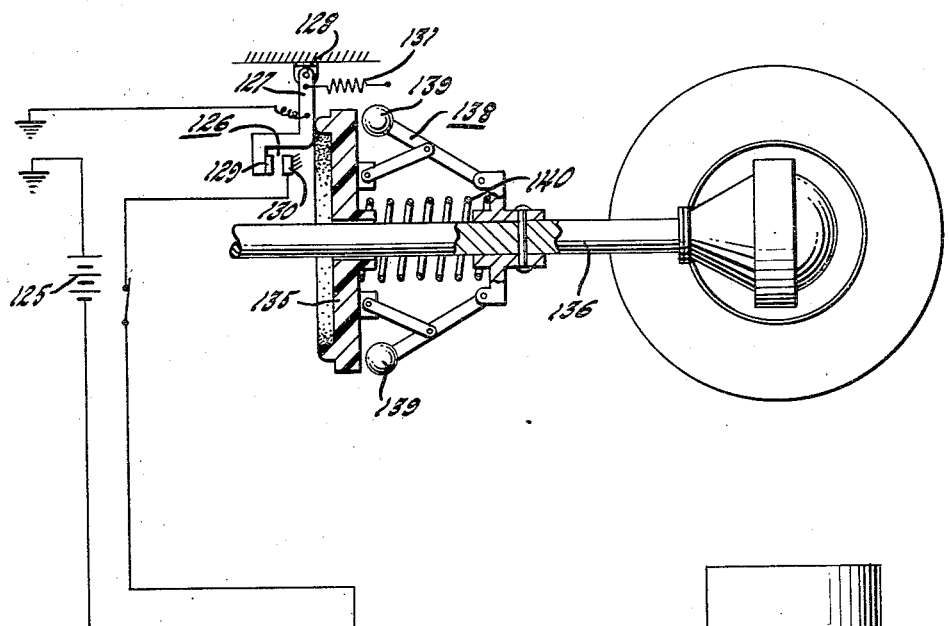
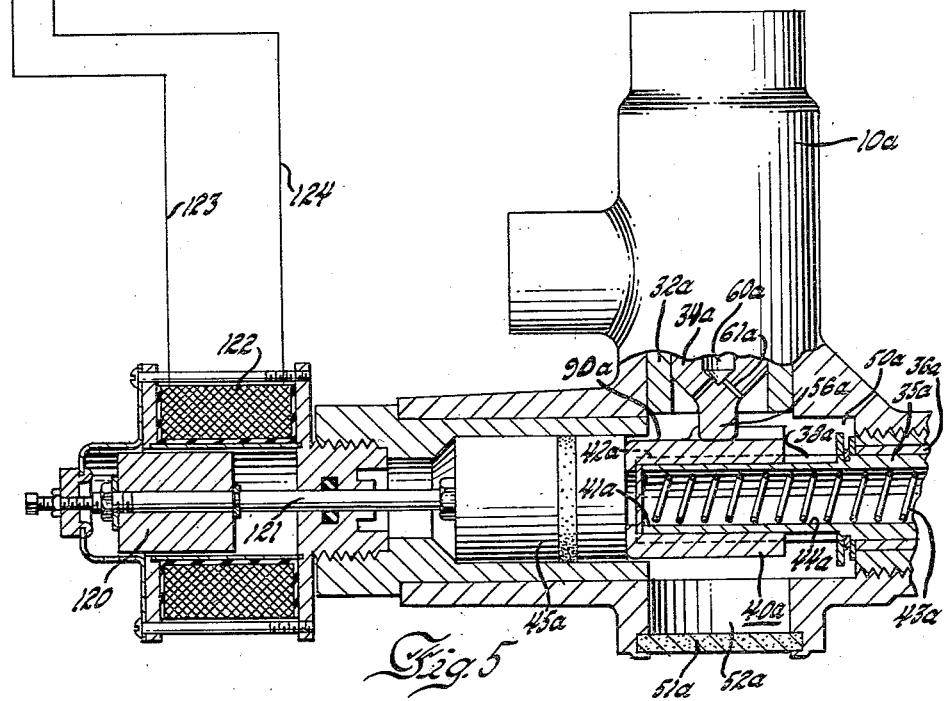
Fig. 5
INVENTOR.
George W. Jackson
BY
Graig V. Monton
HIS ATTORNEY

United States Patent Office 2,820,647
Patented Jan. 21, 1958

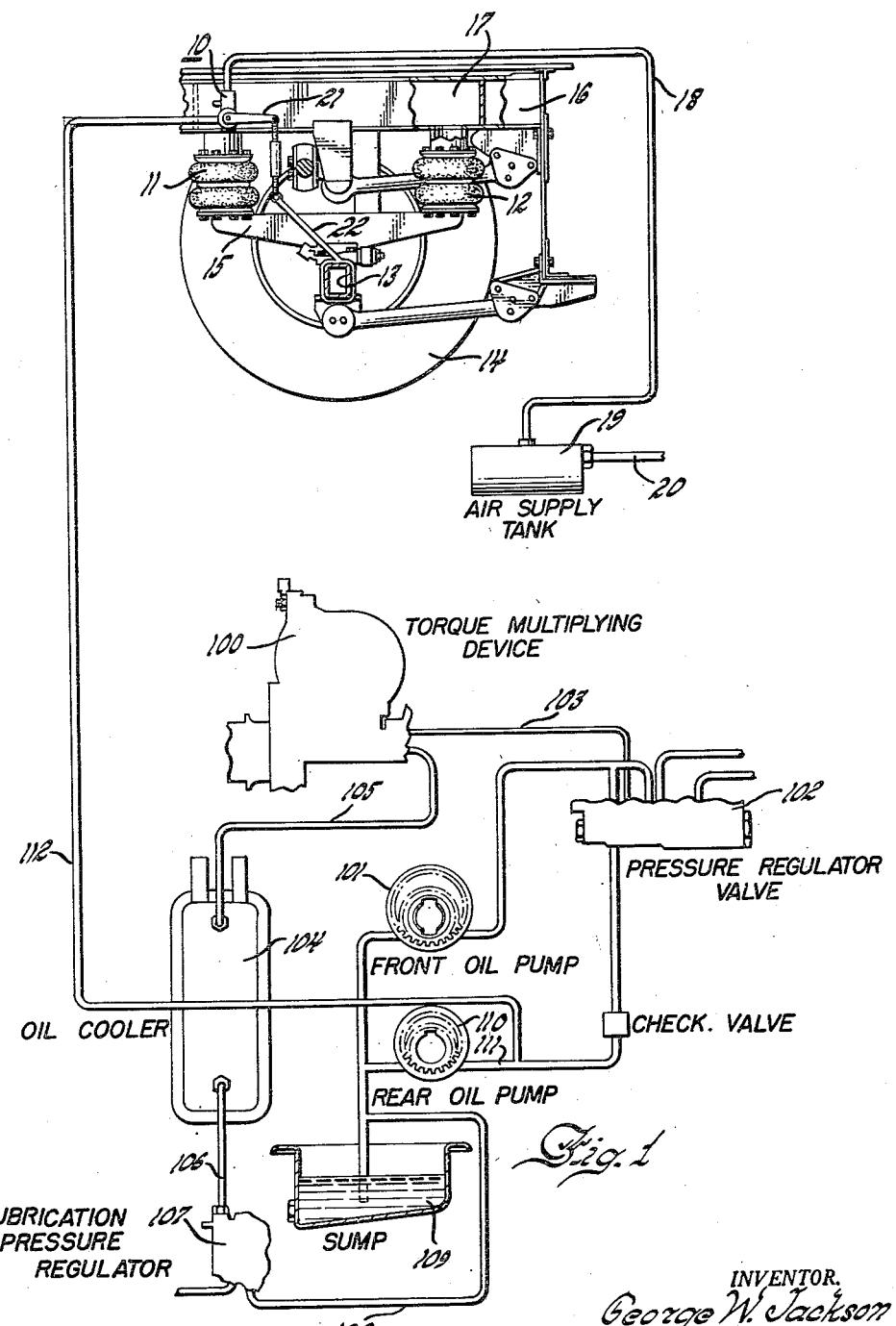

2,820,647

CONTROL MECHANISM FOR REGULATING FLUID FLOW IN A VEHICLE SUSPENSION

George W. Jackson, Dayton, Ohio, assignor to General Motors Corporation, Detroit, Mich., a corporation of Delaware Application August 30, 1955, Serial No. 531,375

9 Claims. (Cl. 280—124)

This invention relates to an improved control device for regulating the supply of air to and exhaust of air from a pneumatic suspension system for a motor vehicle.

The invention is particularly adapted for use in connection with a vehicle suspension system in which air springs provide the resilient means for supporting the body of the vehicle upon its running gear or axles. The air spring may be in the form of an air cushion, a bellows or a piston and cylinder inflated or charged with a volume of fluid, preferably air, under sufficient pressure to support the body of the vehicle above the axle.

The total movement between the body of a vehicle and the axle is limited due to various construction arrangements. Passenger vehicles are subject to wide load variations so that if the air springs are inflated with a fluid pressure value sufficient to maintain a predetermined clearance distance between the body and the axle of a vehicle under a relatively light load condition, the pressure in the air spring is insufficient to sustain a heavy load condition without the body of the vehicle striking the axle of the vehicle. Under a heavy load condition it is therefore necessary to increase the fluid pressure within the air spring to sustain the heavier load at a clearance distance from the axle of the vehicle the same as when the vehicle is carrying a light load.

To obtain full benefit from the use of comfortable riding air springs and to avoid "bottoming" on the axle, it is necessary to vary the degree of inflation of the air springs by increasing or decreasing the value of the fluid pressure in the air spring in response to load changes.

Obviously, if the fluid pressure in an air spring is low, that is of a value to properly support the body relative to the axle under a light load condition, that the body will move downwardly toward the axle when the load condition in the body increases. This relative movement between the body and the axle can be utilized to actuate fluid control valves to supply an increased fluid pressure to the air spring to return the body to its former predetermined height clearance between the body and the axle. As the load in the body decreases, the reverse condition will be created and the increased air pressure in the air spring can be exhausted to allow the body to move downwardly toward the axle to the predetermined height clearance.

It is an object of this invention to provide a control mechanism for regulating the supply of air to an air spring and exhaust of air from the air spring to establish a predetermined height clearance between the sprung mass and the unsprung mass of the vehicle under varying load conditions wherein the mechanism is adapted to be rendered ineffective during advancement movement of the vehicle to prevent changes in the predetermined height clearance between the sprung mass and the unsprung mass of the vehicle so long as the vehicle is traveling over the road.

Another object of the invention is to provide a control mechanism in accordance with the foregoing object wherein a mechanism is provided that is responsive to advancement movement of the vehicle for actuation of the control mechanism to render it inactive during the period of advancement of the vehicle, the mechanism responsive to the advancement of the vehicle being actuated by fluid means or electrical means that are rendered active by the advancement of the vehicle over the road.

Further objects and advantages of the present invention will be apparent from the following description, reference being had to the accompanying drawings wherein a preferred form of the invention is clearly shown.

In the drawings:

Figure 1 is a schematic illustration of an air spring suspension system incorporating the control mechanism of this invention and connected with a fluid source that is responsive to advancement movement of a motor vehicle to render the control mechanism inactive during the period of advancement of the vehicle over the road.

Figure 2 is a cross sectional view of the control mechanism of this invention.

Figure 3 is a cross sectional view taken along line 3—3 of Figure 2.

Figure 4 is an enlarged cross sectional view of the valve mechanism of this invention.

Figure 5 is a cross sectional view of a modified arrangement of the control mechanism adapted for actuation electrically in response to advancement movement of a motor vehicle.

In Figure 1 there is disclosed an air spring system incorporating the control mechanism 10 that is adapted to supply air to the air spring units 11 and 12 or exhaust air from the air spring units to maintain a predetermined and established height condition between the unsprung mass and the sprung mass of the vehicle.

The unsprung mass of the vehicle comprises the axle 13 and the wheels 14. A support beam 15 is carried upon the axle 13, the beam 15 in turn supporting the air springs 11 and 12 that in turn support the chassis frame 16 of the vehicle. The air springs 11 and 12 are preferably of the expansible bellows type adapted to receive air from and discharge air into the reservoir chamber 17 formed in the box frame of the chassis 16.

The control mechanism 10 is supplied with air under pressure through a conduit 18 that connects with an air supply reservoir 19 that is connected with a suitable air compressor (not shown) by means of the conduit 20. The control mechanism 10 has an actuating arm 21 that is connected with the axle 13 by means of the link mechanism 22 whereby relative movement between the chassis frame 16 and the axle 13 will effect oscillation movement of the arm 21 and thereby actuate the valve mechanism within the control device 10.

With the vehicle in an unloaded condition, the chassis frame 16 is supported in a predetermined height relationship relative to the axle 13, a predetermined air pressure being contained within the air springs 11 and 12 to establish this predetermined height clearance, the air being just sufficient to support the weight of the vehicle body and chassis frame. When the load is increased within the vehicle, the chassis frame 16 tends to move downwardly toward the axle 13, the air pressure in the air springs 11 and 12 at this time being insufficient to support the increased load. Under this circumstance the actuated arm 21 of the control mechanism 10 is moved upwardly to open the valve mechanism of the control to allow air under pressure to be supplied from the line 18 into the reservoir chamber 17 and thus to the air springs 11 and 12 until such time as the increase in air pressure is sufficient to return the chassis frame 16 to a predetermined height relationship relative to the axle 13, whereat the air supply through the line 18 is cut off by the control device 10.

When the load within the vehicle lightens, subsequent to a loaded condition, the high value of air pressure within the air springs 11 and 12 will cause the chassis frame 16 to move upwardly relative to the axle 13. This action will cause downward movement of the actuating arm 21 to effect operation of the control mechanism 10 whereby to exhaust air from the reservoir chamber 17 and thus the air springs 11 and 12 until such time as the reduced air pressure in the air springs allows the chassis frame 16 to return to its predetermined height relationship relative to the axle 13, wherein the control mechanism 10 closes against exhaust of air from the reservoir 17.

In Figure 2 there is disclosed the control mechanism of this invention that comprises a housing 30 that has a chamber 31 forming a passage through which fluid flows to and from the air springs 11 and 12 in a manner hereinafter described. The chamber 31 receives a cylindrical sleeve 32 provided with an axial bore 33. A cylindrical member 34 is disposed slidably in the bore 33 for reciprocation therein.

An oscillatable shaft 35 is journaled in the bearing sleeve 36 provided in the housing 30. One end of the oscillatable shaft 35 carries the actuating arm 21 secured to the shaft 35 by the set screw 37. Movement of the arm 21 as a result of relative movement between the chassis frame 16 and the axle 13 in the manner hereinbefore described effects oscillation of the shaft 35.

The inner end of the shaft 35 has the spline 38 provided on the external periphery of the shaft 35. A cam member 40 has an axial bore 41 provided with an internal spline 42 corresponding to the external spline 38 on the shaft 35. The cam 40 is supported on the shaft 35 and the cooperating splines 42 and 38 permit axial movement of the cam member 40 on the shaft 35. A compression spring 43 positioned within the bore 44 in the shaft 35 engages the cam 40 to normally retain it in engagement with a piston 45 that is slidably movable within a cylinder 46 carried in the housing 30. Fluid under pressure is adapted to be supplied into the cylinder chamber 47 through the passage 48 to move the piston 45 against the action of the spring 43 in a manner and for a purpose hereinafter described.

The cam member 40 is disposed in an exhaust chamber 50 provided in the housing 30, a porous closure member 51 being provided in the outlet port 52 from the exhaust chamber.

The cam member 40 is provided with three land surfaces 53, 54 and 55, see Fig. 3. The land surface 54 is radially intermediate the land surfaces 53 and 55 and provides for a neutral position of the control mechanism in a manner hereinafter described.

The reciprocable member 34 has a reduced diameter end portion 56 that engages the cam surfaces 53, 54 and 55 upon oscillation of the shaft 35 in one direction or the other whereby the member 34 is moved upwardly from the position shown in Fig. 2 when the end portion 56 rides upon the high cam surface 55 and is moved downwardly from the position shown in Fig. 2 when the end portion rides upon the low cam surface 53. When the end portion 56 is on the intermediate cam surface 54, the member 34 is in the position shown in Fig. 2.

The reciprocable member 34 has an axial bore 60 from which there extends the orifice passages 61 that connect the bore 60 with the exhaust chamber 50 in the housing 30. The upper end 62 of the member 34 is of reduced diameter to provide an annular chamber 63 between the end portion 62 and the bore 33 of the sleeve 32. Radial passages 65 extend through the sleeve 32 to connect the annular chamber 63 with an annular recess 66 provided between the sleeve 32 and the housing 30. The annular recess 66 communicates with a passage 67 that in turn connects with the port 68 that supplies fluid under pressure to the air springs 11 and 12 and permits exhaust of air from the air springs 11 and 12.

A disk valve structure 70 is provided in the chamber 31 and rests upon the seat 71 provided on the upper end of the sleeve 32 and the seat 72 provided on the upper end of the member 34. The disk valve structure 70 comprises a first valve part 73 that rests upon the seat 71 to close the chamber 63 against flow of fluid from the chamber 31 that is in communication with the port 74 that connects with the line 18 for supply of air under pressure to the control mechanism. A second valve part 76 rests upon the valve seat 72 and normally closes the bore 60 against passage of fluid through the bore. Compression springs 77 and 78 engage the valve parts 73 and 76 respectively to retain them upon their respective seats.

As more clearly shown in Fig. 4, the valve part 73 carries an annular ring 79 that rides in a recess 80 provided in the second valve part 76. Thus the valve parts 73 and 76 have limited relative movement with respect to one another upon reciprocation of the member 34. A flexible membrane 81 is positioned between the valve parts 76 and 73 to prevent passage of fluid between the valve parts and to allow for the limited relative movement between the parts.

When the actuating arm 21 moves upwardly, as viewed in Fig. 1 to rotate the shaft 35 in a counter-clockwise direction and thus the cam 40, as viewed in Fig. 3, the member 34 will be moved upwardly from the cam surface 54 to the cam surface 55 thereby lifting valve part 76 for a limited distance until the bottom of the groove 80 engages the member 79 to lift the valve part 73 from its valve seat 71, whereupon air under pressure is delivered from the line 18 through the chambers 31 and 63 into the reservoir chamber 17 supplying the air springs 11 and 12 until such time as the chassis frame 16 rises sufficiently to effect counter rotation of the arm 21 to return the end portion 56 of the member 34 onto the neutral cam surface 54 and thereby return the valve parts 73 and 76 to the positions illustrated in Fig. 2 to close the chamber 63 against further entrance of air under pressure from the chamber 31.

When the load in the vehicle lightens, the chassis frame 16 rises relative to the axle 13 in the manner heretofore described with the arm 21 moving downwardly to rotate the shaft 35 in a clockwise direction. This rotation of the shaft 35 causes the end portion 56 of the member 34 to move off of the neutral cam surface 54 onto the low cam surface 53. When this action occurs the member 34 moves downwardly with the valve part 76 resting on the valve seat 72 until the upper lip of the groove 80 engages the member 79, whereafter further downward movement of the member 34 causes the valve seat 72 to move away from the valve part 76 and open the bore 60 in the member 34. This action results in exhaust of air from the air springs 11 and 12 through the port 68, chamber 63, bore 60, passages 61 and the exhaust chamber 50 until such time as the chassis frame 16 moves downwardly toward the axle 13 to cause reverse rotation of the shaft 35 and return the end portion 56 of member 34 onto the neutral cam surface 54 with the valve parts 76 and 73 being returned to their positions illustrated in Fig. 2, thereby cutting off exhaust flow of fluid from the air springs 11 and 12.

The foregoing action of the control mechanism will be obtained during any relative movement between the chassis frame 16 and the axle 13. However, it is not desirable for air to be continuously supplied to and exhausted from the air springs 11 and 12 when the vehicle is traveling over the road. Hence it is desirable to render the control mechanism ineffective as soon as advancement movement of the vehicle begins. This is accomplished in this invention by movement of the piston 45 in a right hand direction against the cam member 40 to shift the cam 40 in a right hand direction until the lower portion 56 will ride upon the surface 90 that is concentric with the axis of the cam member 40, which surface is at the radial level of the neutral surface 54 of the cam member. When this occurs oscillation of the shaft 35 will not cause reciprocation of the member 34 with resultant actuation of the disk valve structure 70 in the manner heretofore described.

To shift the cam member 90 in a right hand direction, fluid pressure is supplied from a suitable source of pressure fluid on the vehicle that responds to initial advancement movement of the vehicle.

Such an arrangement is disclosed in the lower part of the schematic drawing of Fig. 1 wherein there is disclosed a torque multiplying device 100 of any of the conventional automatic transmission types, one of which is the well known "Dynaflow." Fluid under pressure is supplied to the torque multiplying device by an oil pump 101 that is driven concurrently with the engine shaft for supplying oil under pressure at all times to the pressure regulating valve 102. Some of the oil is circulated through the line 103 through the torque multiplying device 100 for return to the oil cooler 104 through the line 105. From the oil cooler the oil will flow through the line 106 and the lubrication pressure regulator 107 to the line 108 for return to the sump 109.

A second oil pump 110 is provided in the automatic transmission and is driven only when the propeller shaft rotates. Thus this oil pump 110 is responsive to advancement movement of the vehicle either forwardly or rearwardly to supply oil under pressure into the line 111 that in turn is connected to the oil pressure supply line 112 that connects with the cylinder chamber 47 of the cylinder 46. Fluid under pressure delivered by the oil pump 110 will thus cause movement of the piston 45 of the control device to move in a right hand direction in response to advancement movement of the vehicle so as to render the valve mechanism ineffective for supply of air to or exhaust of air from the air springs 11 and 12 as soon as the vehicle is in motion.

In Fig. 5 there is illustrated a modified arrangement for rendering the control mechanism ineffective wherein an electrically responsive device is rendered active upon initial advancement movement of a motor vehicle. The control mechanism of Fig. 5 is identical with the mechanism shown in Fig. 2 so that corresponding parts carry corresponding numerals (with the suffix "a").

In Fig. 5 the piston 45a that actuates the cam member 40a is connected with a solenoid core member 120 by means of a rod 121. The core member 120 rides within a solenoid coil 122. Normally the spring 43a retains the piston 45a and the core 120 in the position illustrated in Fig. 5 so long as the vehicle is parked or in a standing position.

The solenoid coil is connected by means of the electric lines 123 and 124 with a battery 125 through a control switch 126.

The control switch 126 comprises an arm 127 that is pivoted at 128 and carries a contact 129 on the lower end thereof adapted to engage the stationary contact 130 when the arm 127 is moved in a right hand direction by the tension spring 131. The switch arm 127 is actuated by a rotatable plate member 135 that is moved axially to the drive shaft 136 by means of a speed responsive mechanism 138. As the flyball weights 139 move outwardly as a result of rotation of the speed responsive mechanism 138 by the drive shaft 136, the plate 135 is pulled against the compression of the spring 140 to permit contact 129 to engage contact 130 and thereby energize the solenoid coil 122. This action pulls the core 120 into the solenoid coil 122 to move the piston 45a in a right hand direction to move the cam member 40a axially in a right hand direction until the concentric surface 90a engages the end portion 56a of the reciprocable member 32a.

Except that the device illustrated in Fig. 5 is responsive to electrical actuation to render the device ineffective upon initial advancement movement of the vehicle, the device operates in exactly the same manner as that illustrated in Fig. 2.

While the form of embodiment of the invention as herein disclosed constitutes a preferred form, it is to be understood that other forms might be adopted as may come within the scope of the claims which follow.

What is claimed is as follows:

1. Control means adapted for regulation of the supply and exhaust of fluid to and from an expansible fluid spring for a motor vehicle to maintain a regulated height between the sprung mass and the unsprung mass of the vehicle, comprising, fluid control means having passage means therein for conducting fluid to and from a fluid spring and including valve means regulating fluid flow through the said passage means in either direction and further including operating means engaging the valve means adapted for actuation by relative movement between the sprung mass and the unsprung mass of a vehicle to effect regulated flow through said passage means in response to height changes between the sprung mass and the unsprung mass of a vehicle, said operating means including cam means having an operative position and an inoperative position and means actuated in response to advancement movement of the vehicle to shift said cam means from its operative to its inoperative position to render said operating means ineffective for operation of the valve means so long as advancement movement of the vehicle continues.

2. Control means adapted for regulation of the supply and exhaust of fluid to and from an expansible fluid spring for a motor vehicle to maintain a regulated height between the sprung mass and the unsprung mass of the vehicle, comprising, fluid control means having passage means therein for conducting fluid to and from a fluid spring and including valve means regulating fluid flow through the said passage means in either direction and further including cam means engaging the valve means for actuation of the valve means and adapted for actuation by relative movement between the sprung mass and the unsprung mass of a vehicle, operating means for the valve means adapted for actuation by relative movement between the sprung mass and the unsprung mass of a vehicle to effect regulated flow through said passage means in response to height changes between the sprung mass and the unsprung mass of a vehicle, and means actuated in response to advancement movement of the vehicle to move the cam means relative to the valve means and render thereby said cam means ineffective for operation of the valve means so long as advancement movement of the vehicle continues.

3. Control means adapted for regulation of the supply and exhaust of fluid to and from an expansible fluid spring for a motor vehicle to maintain a regulated height between the sprung mass and the unsprung mass of the vehicle, comprising, fluid control means having passage means therein for conducting fluid to and from a fluid spring and including valve means regulating fluid flow through the said passage means in either direction and further including cam means engaging the valve means for actuation of the valve means and adapted for actuation by relative movement between the sprung mass and the unsprung mass of a vehicle, operating means for the valve means adapted for actuation by relative movement between the sprung mass and the unsprung mass of a vehicle to effect regulated flow through said passage means in response to height changes between the sprung mass and the unsprung mass of a vehicle, and means actuated in response to advancement movement of the vehicle to render said cam means operatively ineffective for operation of the valve means so long as advancement movement of the vehicle continues.

4. Control means adapted for regulation of the supply and exhaust of fluid to and from an expansible fluid spring for a motor vehicle to maintain a regulated height between the sprung mass and the unsprung mass of the vehicle, comprising, fluid control means having passage means therein for conducting fluid to and from a fluid spring, valve means for regulating fluid flow through said passage means having one position to provide for flow of fluid through said passage means in one direction and a second position providing for flow of fluid through said passage means in the reverse direction, cam means engaging said valve means and having one position to place said valve means in its one position and a second position to place the said valve means in its second position, and means actuated in response to advancement movement of the vehicle operatively connected with said cam means to render said cam means ineffective to position said valve means in either of its positions so long as advancement movement of the vehicle continues.

5. Control means adapted for regulation of the supply and exhaust of fluid to and from an expansible fluid spring for a motor vehicle to maintain a regulated height between the sprung mass and the unsprung mass of the vehicle, comprising, fluid control means having passage means therein for conducting fluid to and from a fluid spring, valve means for regulating fluid flow through said passage means having one position to provide for flow of fluid through said passage means in one direction and a second position providing for flow of fluid through said passage means in the reverse direction, cam means engaging said valve means and having one position to place said valve means in its one position and a second position to place the said valve means in its second position and a third position in which said valve means is placed in a neutral position to prevent flow of fluid in either direction through said valve means, and means actuated in response to advancement movement of the vehicle to position said cam means in its said third position so long as advancement movement of the vehicle continues.

6. Control means adapted for regulation of the supply and exhaust of fluid to and from an expansible fluid spring for a motor vehicle to maintain a regulated height between the sprung mass and the unsprung mass of the vehicle, comprising, a housing having passage means therein for conducting fluid to and from a fluid spring, a reciprocable valve means in said housing having one position providing flow of fluid through said passage means in one direction and a second position providing for flow of fluid through said passage means in a reverse direction, oscillatable shaft means carried in said housing having cam means thereon engageable with said valve means to effect positioning of said valve means in either of its positions depending on the rotation of said cam means, operating means on said shaft exteriorly of said housing to effect oscillation of the shaft means in response to height changes between the sprung mass and the unsprung mass of a vehicle, and means actuated in response to advancement movement of the vehicle to move said cam means relative to said valve means to effect operative disengagement therebetween to prevent operation of said valve means by oscillation of said shaft means so long as advancement movement of the vehicle continues.

7. Control means adapted for regulation of the supply and exhaust of fluid to and from an expansible fluid spring for a motor vehicle to maintain a regulated height between the sprung mass and the unsprung mass of the vehicle, comprising, a housing having passage means therein for conducting fluid to and from a fluid spring, a reciprocable valve means in said housing having one position providing for flow of fluid through said passage means in one direction and a second position providing for flow of fluid through said passage means in a reverse direction, oscillatable shaft means having cam means thereon within said housing engaging said valve means to actuate the same, said cam means having a first cam to position said valve means in its first position and a second cam surface to position said valve means in its second position and a third cam surface to position said valve means in a neutral actively ineffective position, and means actuated in response to advancement movement of the vehicle to move said cam means relative to said valve means and dispose said third cam surface continuously in engagement with said valve means to prevent operation thereof so long as advancement movement of the vehicle continues.

8. Control means in accordance with claim 7 in which the said means actuated in response to advancement movement of the vehicle comprises a fluid responsive member.

9. Control means in accordance with claim 7 in which the means actuated in response to advancement movement of the vehicle comprises an electrically responsive device.

References Cited in the file of this patent

UNITED STATES PATENTS

| | | |
|---|---|---|
| 1,585,833 | Down | May 25, 1926 |
| 1,890,494 | Borden | Dec. 13, 1932 |
| 2,171,316 | Sittert | Aug. 29, 1939 |
| 2,490,311 | Rostu | Dec. 6, 1949 |
| 2,687,311 | Nallinger | Aug. 24, 1954 |